(12) United States Patent
Iwasaki

(10) Patent No.: US 8,367,230 B2
(45) Date of Patent: Feb. 5, 2013

(54) PERPENDICULAR MAGNETIC RECORDING MEDIUM AND MAGNETIC RECORDING/REPRODUCTION APPARATUS

(75) Inventor: Takeshi Iwasaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 398 days.

(21) Appl. No.: 12/015,100

(22) Filed: Jan. 16, 2008

(65) Prior Publication Data

US 2008/0182131 A1 Jul. 31, 2008

(30) Foreign Application Priority Data

Jan. 26, 2007 (JP) ................................. 2007-016637

(51) Int. Cl.
*G11B 5/66* (2006.01)
(52) U.S. Cl. ....................................................... 428/831
(58) Field of Classification Search .................... None
See application file for complete search history.

(56) References Cited

U.S. PATENT DOCUMENTS

| | | | |
|---|---|---|---|
| 6,221,508 B1 | 4/2001 | Kanbe et al. | |
| 6,574,060 B2 | 6/2003 | Kanbe et al. | |
| 6,846,582 B2 * | 1/2005 | Onuma et al. | 428/831 |
| 7,050,253 B2 | 5/2006 | Kanbe et al. | |
| 2005/0214588 A1 * | 9/2005 | Iwasaki et al. | 428/831 |
| 2005/0227122 A1 * | 10/2005 | Takahashi et al. | 428/832.1 |

FOREIGN PATENT DOCUMENTS

| | | | |
|---|---|---|---|
| JP | 2003-077122 | | 3/2003 |
| JP | 2003077122 A | * | 3/2003 |
| JP | 2004-327006 | | 11/2004 |
| JP | 2004327006 A | * | 11/2004 |
| JP | 2005-044464 | | 2/2005 |
| JP | 2005044464 A | * | 2/2005 |
| JP | 2007-052852 | | 3/2007 |

OTHER PUBLICATIONS

Japanese Office Action dated Aug. 3, 2010.

* cited by examiner

*Primary Examiner* — Holly Rickman
*Assistant Examiner* — Linda Chau
(74) *Attorney, Agent, or Firm* — Pillsbury Winthrop Shaw Pittman, LLP

(57) ABSTRACT

According to one embodiment, a soft magnetic layer, a first nonmagnetic underlayer having a fine crystal structure and made of Pd or a Pd alloy, a second nonmagnetic underlayer made of Ru or an Ru alloy, and a perpendicular magnetic recording layer are stacked on a nonmagnetic substrate.

5 Claims, 2 Drawing Sheets

PERPENDICULAR MAGNETIC RECORDING MEDIUM AND MAGNETIC RECORDING/REPRODUCTION APPARATUS

CROSS-REFERENCE TO RELATED APPLICATIONS

This application is based upon and claims the benefit of priority from Japanese Patent Application No. 2007-016637, filed Jan. 26, 2007, the entire contents of which are incorporated herein by reference.

BACKGROUND

1. Field

One embodiment of the present invention relates to a perpendicular magnetic recording medium and magnetic recording/reproduction apparatus for use in, e.g., a hard disk drive using the magnetic recording technique.

2. Description of the Related Art

Recently, a demand has arisen for increasing the capacity of a hard disk drive, and the recording bit size is more and more decreasing as the recording density increases. To form a large-capacity hard disk medium, it is necessary not only to decrease the recording bit size but also to improve the recording/reproduction characteristics, i.e., reduce noise generated from the medium. The main cause of the medium noise is presumably a zigzagged domain wall in the bit boundary portion. One method of reducing the noise generated from the bit boundary portion is to form a clearer recording bit boundary. This makes it possible to reduce the magnetic interaction between recording bits, and accurately perform recording/reproduction in each individual bit.

It is disclosed by, for example, Jpn. Pat. Appln. KOKAI Publication No. 2003-77122, an example of the means for improving the recording/reproduction characteristics is a technique in which in a perpendicular magnetic recording medium formed by sequentially stacking at least a nonmagnetic underlayer, magnetic layer, and protective layer on a nonmagnetic substrate, the magnetic layer is made of ferromagnetic crystal grains and a nonmagnetic grain boundary mainly containing an oxide, the nonmagnetic underlayer is made of a metal or alloy having the hexagonal closest packed crystal structure, and a seed layer made of a metal or alloy having the face-centered cubic crystal structure is formed between the nonmagnetic underlayer and nonmagnetic substrate. This technique is particularly characterized in that the seed layer is made of a metal selected from Cu, Au, Pd, Pt, and Ir, an alloy containing at least one of Cu, Au, Pd, Pt, and Ir, or an alloy containing Ni and Fe. This technique can orient the (111) plane as the closest packed face of the face-centered cubic structure as the seed layer, and can orient the nonmagnetic underlayer formed on the seed layer and having the hexagonal closest packed structure along the (002) plane. This makes it possible to improve the crystal orientation of the recording layer having the same hexagonal closest packed structure as the nonmagnetic underlayer, and obtain a perpendicular magnetic recording medium having good magnetic characteristics.

When the crystalline seed layer having the face-centered cubic structure is used, however, the crystal orientation improves, but the crystal grains become difficult to downsize because the grain size of the seed layer is reflected on the nonmagnetic underlayer.

As disclosed in Jpn. Pat. Appln. KOKAI Publication No. 2004-327006, for example, there is a technique having tried to improve the recording/reproduction characteristics and increase the thermal decay resistance by using a perpendicular magnetic recording medium in which at least a soft magnetic underlayer, first nonmagnetic underlayer, second nonmagnetic underlayer, perpendicular magnetic recording film, and protective film are formed on a nonmagnetic substrate, the first underlayer is made of Pt, Pd, or an alloy of at least one of Pt and Pd, and the second nonmagnetic underlayer is made of Ru or an Ru alloy. In particular, a Pt alloy or Pd alloy obtained by adding another element to Pt or Pd can be used in the first underlayer in order to downsize the crystal grains. Favorable examples of the additive element are B, C, P, Si, Al, Cr, Co, Ta, W, Pr, Nd, and Sm. This technique has tried to improve the crystallinity of the second nonmagnetic underlayer and magnetic recording layer by particularly adding C.

Unfortunately, although the crystal orientation and recording/reproduction characteristics improve by the addition of the additive to Pt or Pd, grains are observed in the first nonmagnetic underlayer, i.e., the layer maintains the shape of a crystal grain as described in the embodiment. In this case, the grain size in the first nonmagnetic underlayer imposes limitation and makes it difficult to further decrease the grain size in the magnetic recording layer.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, a perpendicular magnetic recording medium according to one embodiment of the invention comprises a nonmagnetic substrate, one or more soft magnetic layers formed on the nonmagnetic substrate, a first nonmagnetic underlayer formed on the soft magnetic layer, a second nonmagnetic underlayer formed on the first nonmagnetic underlayer, and a perpendicular magnetic recording layer formed on the second nonmagnetic underlayer.

The first nonmagnetic underlayer has a fine crystal structure and is made of Pd or a Pd alloy.

The second nonmagnetic underlayer is made of Ru or an Ru alloy.

The fine crystal structure used in the present invention is a structure intermediate between a polycrystal structure and amorphous structure. This structure is obtained when the polycrystal structure more finely breaks up and fine crystalline grains of, e.g., about 1 to 3 nm aggregate.

When the first nonmagnetic underlayer having the fine crystal structure as described above is formed, the crystal grains in the second nonmagnetic underlayer and perpendicular magnetic recording layer formed on the first nonmagnetic underlayer and having the crystal structure can be formed finer without being limited by the grain size of the first nonmagnetic underlayer. Also, since the first nonmagnetic underlayer is held in not an amorphous state but a fine crystal state, the crystal orientation of the second nonmagnetic underlayer can be improved. In addition, it is possible to improve the orientation of the perpendicular magnetic recording layer formed on the second nonmagnetic underlayer.

As described above, the present invention uses the first nonmagnetic underlayer having the fine crystal structure. This makes it possible to improve the orientation and decrease the grain size of the perpendicular magnetic recording layer, thereby greatly improving the recording/reproduction characteristics. Consequently, a perpendicular magnetic recording medium capable of high-density recording can be obtained.

The present invention will be explained in more detail below with reference to the accompanying drawing.

Figure 1:
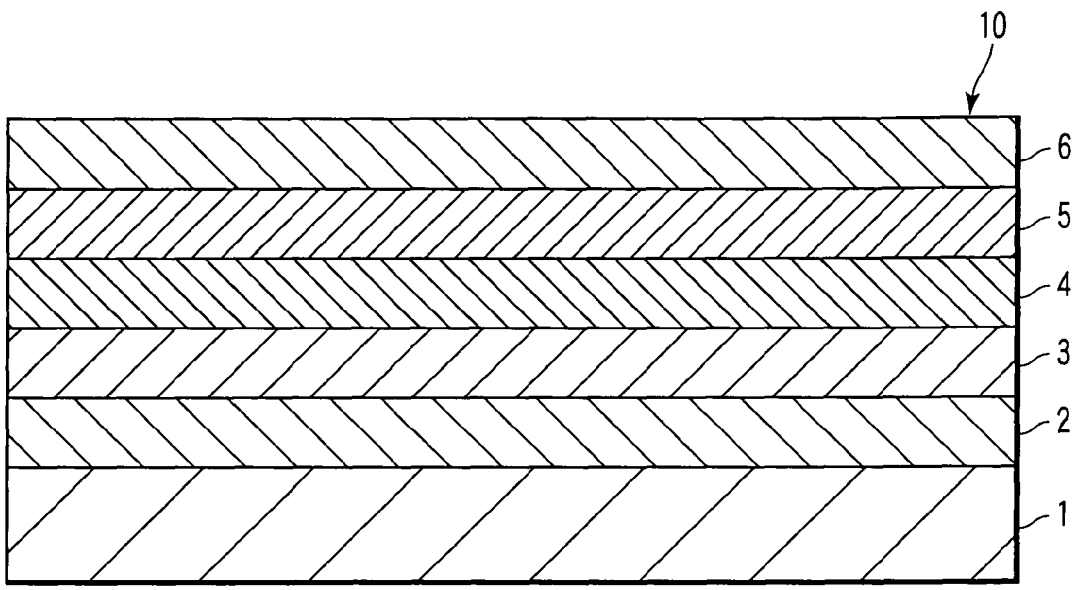
FIG. 1 is a sectional view schematically showing the arrangement of a perpendicular magnetic recording medium according to an embodiment of the present invention.

FIG. 1 is a sectional view schematically showing the arrangement of a perpendicular magnetic recording medium according to an embodiment of the present invention.

Referring to FIG. 1, a perpendicular magnetic recording medium 10 is formed by sequentially stacking a soft magnetic backing layer 2, first nonmagnetic underlayer 3, second nonmagnetic underlayer 4, perpendicular magnetic recording layer 5, and protective film 6 on a nonmagnetic substrate 1. The surface of the protective layer 6 may also be coated with a lubricant such as perfluoroether by dipping or the like, thereby forming a lubricating layer (not shown).

In the present invention, the soft magnetic backing layer is first formed on the nonmagnetic substrate. Since this soft magnetic backing layer having a high magnetic permeability is formed, a so-called double-layered perpendicular magnetic recording medium having the perpendicular magnetic recording layer on the soft magnetic backing layer is obtained. In this double-layered perpendicular magnetic recording medium, the soft magnetic backing layer horizontally passes a recording magnetic field from a magnetic head such as a single-pole head for magnetizing the perpendicular magnetic recording layer, and returns the recording magnetic field to the magnetic head, thereby performing part of the function of the magnetic head.

The soft magnetic backing layer can apply a steep sufficient perpendicular magnetic field to the magnetic field recording layer, and increase the recording/reproduction efficiency.

A soft magnetic material used as the soft magnetic backing layer is a material having a high saturation magnetic flux density and good soft magnetic characteristics. Examples are CoZrNb, CoTaZr, FeCoB, FeCoN, FeTaC, FeTaN, FeNi, CoB, and FeAlSi.

The soft magnetic backing layer used in the present invention is a single layer or a stacked structure having two or more layers. In the stacked structure, given nonmagnetic interlayers can be formed between soft magnetic layers.

Then, a film serving as the first nonmagnetic underlayer is formed on the soft magnetic backing layer. The first nonmagnetic underlayer is formed to downsize the crystal grains in the second nonmagnetic underlayer to be formed on the first nonmagnetic underlayer, and improve the crystal orientation of the crystal grains. The first nonmagnetic underlayer is made of Pd or a Pd alloy. When using the Pd alloy, it is possible to use an alloy of Pd and at least one element selected from B, Hf, Si, Ti, Zr, Ge, Al, Cr, Mg, and V.

An alloy of Pd and Si may also be used as the first nonmagnetic underlayer.

Note that a material mixture of Pd and Si is also a Pd alloy.

The first nonmagnetic underlayer must have the fine crystal structure.

The term "fine crystal structure" indicates structures within a broad range between the polycrystal structure and amorphous structure. However, the fine crystal structure used in this application means the aggregation of fine crystalline grains of about 1 to 3 nm formed by more finely dividing the polycrystal structure, and does not include a so-called granular structure (segregated fine granular crystals) in which an amorphous portion segregates around a fine grain.

Also, the fine crystal structure of this application is not detected as any clear peak structure when measured by X-ray diffraction, while lattice stripes are clearly observed in a sectional TEM structure or the like. It is sometimes possible to observe the fine crystal structure of this application as many spots different from an amorphous ring by electron beam diffraction or the like.

The present invention can eliminate the limitation imposed by the grain size of the first nonmagnetic underlayer by using the first nonmagnetic underlayer having not the crystal grain structure but the fine crystal structure and made of Pd or a Pd alloy, thereby downsizing the crystal grains in the second nonmagnetic underlayer and perpendicular magnetic recording layer. An amorphous material having no grain structure can also eliminate the limitation imposed by the grain size of the first nonmagnetic underlayer. However, this amorphous structure cannot improve the orientation of the second nonmagnetic underlayer at the same time. The segregated fine granular crystals also make downsizing possible because the grain size of the fine granular crystals is small, but cannot eliminate the limitation imposed by the grain size of the first nonmagnetic underlayer. Therefore, the segregated fine granular crystals differ from the technique of the present invention. In this case, however, the degree of improvement of the orientation compares favorably with that when a Pd polycrystal underlayer having the face-centered cubic structure is used. On the other hand, when the first nonmagnetic underlayer having the fine crystal structure is used as in the present invention, the orientation of the second nonmagnetic underlayer can be further improved compared to the case where the underlayer having the Pd polycrystal structure is used. When the second nonmagnetic underlayer made of Ru or an Ru alloy is formed on the first nonmagnetic underlayer having the Pd polycrystal structure, a lattice relaxing layer (initial layer) for lattice matching is formed during epitaxial growth from the first nonmagnetic underlayer to the second nonmagnetic underlayer because these two underlayers have a lattice constant difference. This lattice relaxing layer is readily formed especially in the second nonmagnetic underlayer made of Ru or an Ru alloy. On the other hand, in the first nonmagnetic underlayer having the fine crystal structure used in the present invention, the volume of the fine crystals is small, and the lattice strain is forced inside the fine crystals having a small stress, so the lattice relaxing layer is formed on the side of the first nonmagnetic underlayer. Accordingly, it is possible to further improve the orientation of the second nonmagnetic underlayer compared to the case where the Pd polycrystal structure is used. This effect cannot be obtained by the fine granular crystals.

This fine-crystal Pd or Pd alloy film can be obtained by silicidizing a portion of, e.g., a Pd film. This silicidation can be performed by forming a Pd or Pd alloy film in contact with a nonmagnetic seed layer made of Si or an Si compound. When the Pd or Pd alloy layer is thus formed, a portion of this Pd or Pd alloy layer on the substrate side is silicidized. Since a portion of the Pd or Pd alloy layer on the recording layer side cannot maintain the grain size any longer, fine crystals are formed.

When using a Pd—Si alloy as the first nonmagnetic underlayer, it is possible to use a stacked structure including a first Pd—Si layer and a second Pd—Si layer having a Pd/Si composition ratio different from that of the first Pd—Si alloy layer. Another Pd—Si layer may also be stacked if necessary. In this structure, the first Pd—Si layer on the soft magnetic layer side functions as an Si supply layer. Therefore, the Si content in the first Pd—Si layer can be made larger than that in the second Pd—Si layer formed on the perpendicular magnetic recording layer side. If the Si content in the Pd—Si film on the perpendicular magnetic recording layer side increases, the Pd—Si film becomes an amorphous film or segregated fine granular crystal film. This often makes it difficult to obtain the crystal structure improving effect.

The Si content in the second Pd—Si layer on the perpendicular magnetic recording layer side can be set at less than 10 at %, and can also be set at 3 to 10 at %. If this Si content is larger than 10 at %, the Pd—Si film readily becomes an amorphous film or segregated fine granular crystal film, so the crystal orientation improving effect is difficult to obtain. When the Si content is 3 at % or more, it is easy to obtain the effect of the fine crystals in the Pd—Si film.

On the other hand, the Si content in the first Pd—Si layer on the soft magnetic layer side can be set at 10 at % or more, and can also be set at 10 to 100 at %. If this Si content is less than 10 at %, the Si supply amount reduces, and this makes it difficult to obtain fine crystals in the Pd—Si film on the perpendicular magnetic recording layer side. The use of the silicidation reaction has the advantages that the film can be flattened more and the orientation can be improved more than when a film is normally formed. This is the characteristic feature unique to the silicidation reaction. If a uniform single-layered Pd—Si film having no composition ratio change is formed as the Pd—Si layer, an amorphous structure is often formed because it is difficult to form a fine granular crystal structure in which Si segregates around Pd grains, an ortho rhombic structure as the original structure of a Pd—Si film, or a crystal structure. It is also impossible to obtain the planarization effect unique to the silicidation reaction. This often makes it difficult to improve the orientation of the second nonmagnetic underlayer. On the other hand, a fine-crystal Pd—Si film can be formed by stacking Pd—Si layers having different composition ratios as in the present invention. To promote the silicidation, the pressure can be set at 0.5 Pa or less when forming films containing Pd and Si. Film formation is also possible at a low pressure of about 0.3 to 0.05 Pa. Since this prevents the oxidation of Si caused by an impurity, more active Si is obtained, and the silicidation reaction is accelerated. If film formation is performed at a generally used pressure of about 0.7 Pa, the silicidation reaction is suppressed because Si is partially oxidized. Consequently, the Pd film or Pd alloy film often fails to form fine crystals, or a segregated granular Pd alloy film is often formed. Note that the pressures herein described are obtained by measuring the whole vacuum chamber used in film formation, but each pressure practically indicates the vacuum degree near the substrate. That is, sputtering generally hardly occurs at a low pressure of 0.5 Pa or less. When the differential exhaust method is used to lower only the pressure near the substrate while the pressure near the chamber or target is kept high in order to prevent the above inconvenience, the above-mentioned desirable vacuum degree is the pressure near the substrate.

The action as described above is unique to Pd or a Pd alloy; almost no crystal orientation improving effect is obtained even when using another material such as Pt of the same platinum family. The present invention makes it possible to obtain a perpendicular magnetic recording medium having good recording/reproduction characteristics and capable of high-density recording, by forming the predetermined second nonmagnetic underlayer and the perpendicular magnetic recording layer on the predetermined first nonmagnetic underlayer.

The second nonmagnetic underlayer has the function of transmitting the grain size and orientation of the stacked underlayer to the magnetic recording layer. It is important that the second nonmagnetic underlayer has appropriate crystal matching with the first nonmagnetic underlayer, and has a crystal face that allows epitaxial growth of the magnetic recording layer. As a material like this, Ru or an Ru alloy having the hexagonal closest packed structure can be used on the surface of the second nonmagnetic underlayer. This material has the advantage that the magnetic recording layer can be easily epitaxially grown on the material. When using an Ru alloy, this Ru alloy can be an alloy of Ru and at least one element selected from Cr, Co, Rh, C, $SiO_2$, $TiO_2$, and $Cr_2O_3$. It is particularly possible to use an alloy of Ru and Cr.

Note that the Ru alloy herein mentioned includes a material mixture of Ru and, e.g., C, $SiO_2$, $TiO_2$, or $Cr_2O_3$.

When the perpendicular magnetic recording layer is epitaxially grown on the second nonmagnetic underlayer, a fine, well-oriented crystal structure obtained in this underlayer can be introduced to the perpendicular magnetic recording layer. The perpendicular magnetic recording layer used in the present invention preferably contains Co and Pt as main components. This perpendicular magnetic recording layer has relatively good crystal orientation, and also has a high thermal decay resistance. The perpendicular magnetic recording layer may also be formed by stacking two or more magnetic recording layers having different compositions. It is also possible to insert a heating/cooling process before and after film formation.

As the material forming the perpendicular magnetic recording layer, it is possible to use, e.g., a CoPt alloy, CoCr alloy, CoCrPt alloy, CoCrPtB alloy, CoCrPtTa alloy, CoCrPt—$SiO_2$ alloy, CoCrPtO alloy, or CoCrPt—$TiO_2$ alloy. It is particularly possible to use a CoCrPt—$SiO_2$ alloy, CoCrPtO alloy, or CoCrPt—$TiO_2$ alloy. Any of these alloys has favorable crystal orientation, large magnetic anisotropy, and a high thermal decay resistance. The magnetic recording layer containing oxygen can make the grain boundary phase clearer, and can break the magnetic interaction more.

At least one protective film can be formed on the perpendicular magnetic recording layer. Examples of the protective layer are C, diamond-like carbon (DLC), $SiN_x$, $SiO_x$, $CN_x$, and $CH_x$.

Any of the soft magnetic backing layer, seed layer, underlayer, second nonmagnetic underlayer, perpendicular magnetic recording layer, and protective film can be formed by various deposition techniques generally used in the field of magnetic recording media. Note that various sputtering methods will be regarded as deposition techniques hereinafter. As these deposition techniques, it is possible to use, e.g., DC magnetron sputtering, RF magnetron sputtering, and vacuum evaporation.

When mixing two or more types of materials, it is also possible to perform single-target sputtering using a composite target, or simultaneous multi-target sputtering using targets of the individual materials.

A lubricating layer can be formed on the surface of the perpendicular magnetic recording medium, e.g., the surface of the magnetic recording layer or protective layer by coating the surface with a lubricant such as perfluoroether by dipping, spin coating, or the like.

Figure 2:
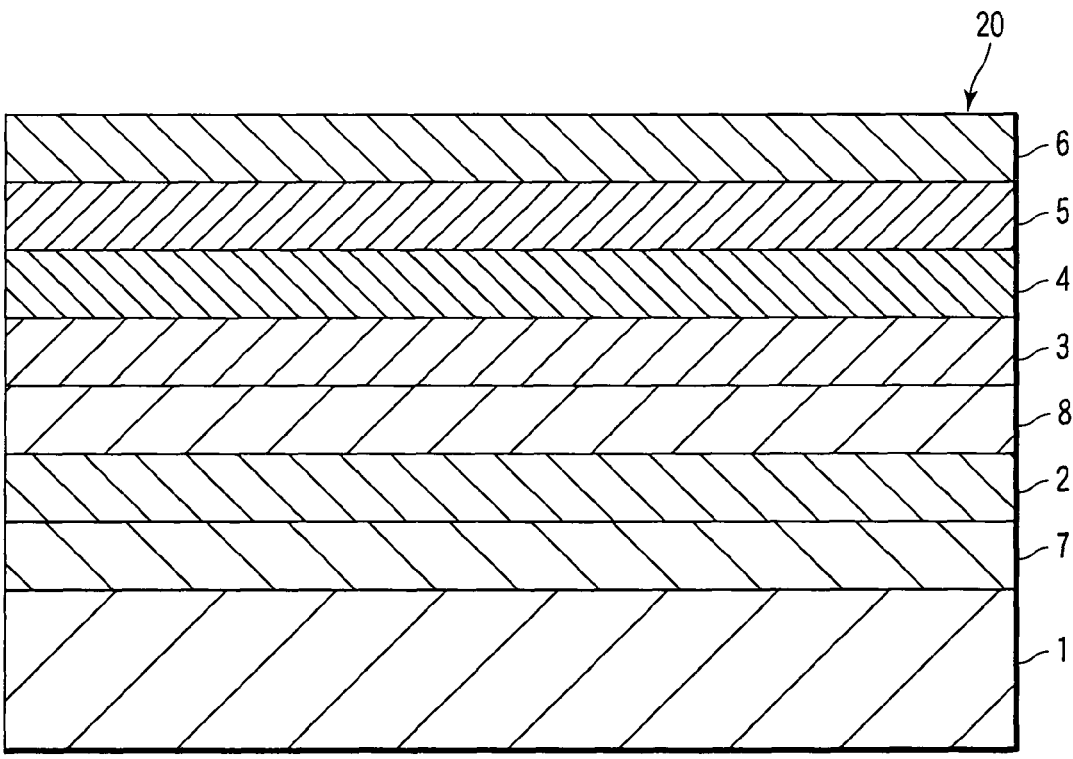
FIG. 2 is a sectional view schematically showing the arrangement of a perpendicular magnetic recording medium according to another embodiment of the present invention.

FIG. 2 is a sectional view schematically showing the arrangement of a perpendicular magnetic recording medium according to another embodiment of the present invention.

A perpendicular magnetic recording medium 20 shown in FIG. 2 has the same arrangement as that shown in FIG. 1 except that a bias application layer 7 such as a longitudinal hard magnetic film or antiferromagnetic layer is formed between a soft magnetic backing layer 2 and nonmagnetic substrate 1, and a nonmagnetic seed layer 8 is formed between the soft magnetic backing layer 2 and a first nonmagnetic underlayer 3.

The soft magnetic backing layer 2 readily forms a magnetic domain, and this magnetic domain generates spike noise. Therefore, the generation of domain walls can be prevented by forming the bias application layer 7 and applying a magnetic field in one direction along the radial direction of the bias application layer 7, thereby applying a bias magnetic field to the soft magnetic backing layer 2 formed on the bias application layer 7. It is also possible to finely disperse the anisotropy and prevent easy formation of large magnetic domains by giving the bias application layer 7 a stacked structure.

Examples of the bias application layer material of the bias application layer 7 are CoCrPt, CoCrPtB, CoCrPtTa, CoCrPtC, CoCrPtCuB, CoCrRuB, CoCrPtWC, CoCrPtWB, CoCrPtTaNd, CoSm, CoPt, CoPtO, CoCrPtO, CoPt—$SiO_2$, and CoCrPtO—$SiO_2$.

Any of these bias application layers can be formed by a film formation method such as sputtering. Note that in order to improve the crystallinity of the bias application layer and decrease its thickness, a plurality of nonmagnetic layers may also be formed between the substrate and bias application layer.

The nonmagnetic seed layer 8 made of Si or an Si alloy can be formed between the soft magnetic backing layer 2 and first nonmagnetic underlayer 3. When the nonmagnetic seed layer 8 made of an Si alloy is formed in contact with the first nonmagnetic underlayer 3 made of Pd or a Pd alloy, a silicidation reaction occurs in the interface between Pd or the Pd alloy and Si or the Si alloy and forms a Pd—Si compound phase. Since the Pd—Si compound phase is formed below the Pd or Pd alloy layer, the Pd or Pd alloy layer readily forms fine crystals.

A metal used in the Si alloy of the nonmagnetic seed layer 8 is desirably at least one element selected from Zr, Hf, Ta, and Pd. Any of these metals easily forms a metal silicide with Si, thereby forming a strong Pd—Si compound phase between the nonmagnetic seed layer and first nonmagnetic underlayer.

The thickness of the nonmagnetic seed layer can be set at 1 to 10 nm. If the film thickness of the nonmagnetic seed layer is less than 1 nm, the uniformity of the composition in the direction of the film surface of the nonmagnetic seed layer becomes insufficient. This often makes the formation of the Pd—Si compound phase with the first nonmagnetic underlayer insufficient. If the film thickness is larger than 10 nm, the distance from a magnetic head to the soft magnetic backing layer increases. This spacing loss often deteriorates the recording/reproduction characteristics of the magnetic recording medium. Annealing such as post annealing may also be performed to promote the formation of the metal silicide layer.

As the nonmagnetic substrate used in the present invention, it is possible to use, e.g., aluminosilicate glass, chemically reinforced glass, an Al-based alloy substrate such as an AlMg substrate, or a nonmagnetic substrate having a higher heat resistance, e.g., a crystallized glass substrate, an Si substrate, a C substrate, a Ti substrate, an Si substrate having an oxidized surface, ceramics, or plastic. The same effect can be expected even when the surface of any of these nonmagnetic substrates is plated with an NiP alloy or the like.

Figure 3:
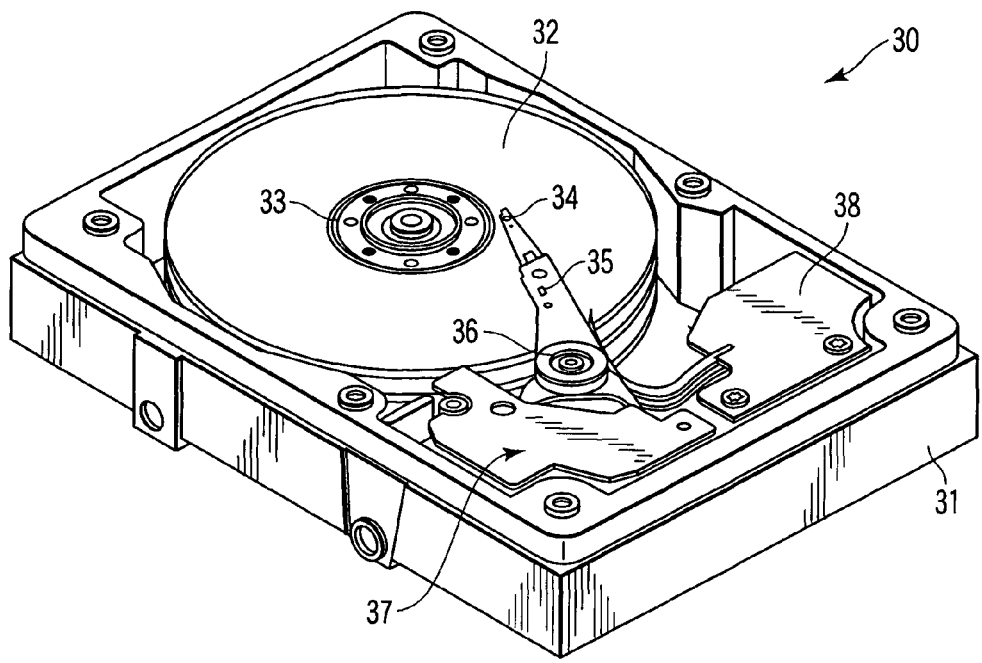
FIG. 3 is a partially exploded perspective view showing an example of a magnetic recording/reproduction apparatus of the present invention.

FIG. 3 is a partially exploded perspective view of a magnetic recording/reproduction apparatus of the present invention.

As shown in FIG. 3, a perpendicular magnetic recording apparatus 30 of the present invention has a rectangular boxy housing 31 having an opening in the upper end, and a top cover (not shown) that is fastened to the housing 31 by screws and closes the upper end opening of the housing.

The housing 31 houses, e.g., a perpendicular magnetic recording medium 32 according to the present invention, a spindle motor 33, a magnetic head 34, a head actuator 35, a rotating shaft 36, a voice coil motor 37, and a head amplifier circuit 38. The spindle motor 33 is a driving means for supporting and rotating the perpendicular magnetic recording medium 32. The magnetic head 34 performs recording and reproduction of magnetic signals with respect to the magnetic recording medium 32. The head actuator 35 has a suspension on the distal end of which the magnetic head 34 is mounted, and movably supports the magnetic head 34 with respect to the perpendicular magnetic recording medium 32. The rotating shaft 36 rotatably supports the head actuator 35. The voice coil motor 37 rotates and positions the head actuator 35 via the rotating shaft 36.

The present invention will be explained in more detail below by way of its examples.

EXAMPLES

Example 1

A nonmagnetic substrate made of a glass substrate for a 2.5-inch magnetic disk was prepared.

This nonmagnetic substrate was placed in a vacuum chamber having a vacuum degree of $1 \times 10^{-5}$ Pa, and DC magnetron sputtering was performed as follows in an Ar ambient at a gas pressure of 0.7 Pa.

First, the nonmagnetic substrate was set to oppose a target, and a 25-nm thick CoCrPt ferromagnetic layer was formed as a bias application layer by discharging DC 500 W to a CoCrPt target.

A 120-nm thick CoZrNb soft magnetic backing layer was formed on the obtained CoCrPt ferromagnetic layer.

After that, a 5-nm thick Si layer was formed as a nonmagnetic seed layer on the CoZrNb soft magnetic backing layer by discharging DC 500 W to an Si target in an Ar ambient at a gas pressure of 0.1 Pa lower than the normal pressure.

Then, a 5-nm thick Pd layer was formed as a first nonmagnetic underlayer on the Si seed layer by discharging. DC 500 W to a Pd target in an Ar ambient at a gas pressure of 0.1 Pa lower than the normal pressure.

In this state, the gas pressure during film formation was returned to the normal 0.7-Pa Ar ambient.

Subsequently, a 20-nm thick Ru layer was formed as a second nonmagnetic underlayer on the Pd first nonmagnetic underlayer by discharging DC 500 W to an Ru target.

After that, a 15-nm thick CoPtCr—SiO$_2$ perpendicular magnetic recording layer was formed on the Ru second nonmagnetic underlayer by preparing a (Co-16 at % Pt-10at % Cr)-8 mol % SiO$_2$ composite target.

Finally, a 7-nm thick C protective film was formed. The substrate on which the films were thus successively formed in the vacuum vessel was extracted to the atmosphere, and a 1.5-nm thick perfluoropolyether-based lubricating film was formed by dipping, thereby obtaining a perpendicular magnetic recording medium.

The obtained perpendicular magnetic recording medium had the same sectional structure as that of the perpendicular magnetic recording medium shown in FIG. 2.

X-ray diffraction measurement was performed on the obtained perpendicular magnetic recording medium. Consequently, an Ru(00.2) peak and CoCrPt(00.2) peak were observed, but no Pd(111) peak was observed.

When rocking curve measurement was performed on these peaks, the half-widths of the peaks were 2.5° (Ru) and 3.0° (CoCrPt).

This reveals that the perpendicular magnetic recording layer had good crystallinity.

Also, transmission analytical electron microscope (TEM) measurement was performed on the obtained perpendicular magnetic recording medium in the direction of the section, thereby checking the crystal structure of the medium of the present invention. As a consequence, the Si seed layer was amorphous because no crystal lattice stripes were observed. On the other hand, crystal lattice stripes were clearly observed in the Pd first nonmagnetic underlayer. However, the directions of these stripes were not uniform, indicating that the first nonmagnetic underlayer had a fine crystal structure.

In the Ru second nonmagnetic underlayer and CoCrPt—SiO$_2$ recording layer, crystal lattice stripes were regularly arranged in a direction perpendicular to the film surface. This shows that epitaxial growth occurred from the second nonmagnetic underlayer to the recording layer.

Then, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the medium of the present invention. Consequently, the perpendicular magnetic recording layer was made of crystal grains having an average grain size of about 4 to 6 nm.

A magnetizing device having an electromagnet was used to apply a magnetic field of 1,185 A/m (15,000 Oe) to the obtained perpendicular magnetic recording medium outward in the radial direction of the disk-like substrate, thereby magnetizing the ferromagnetic layer as a bias application layer in the radial direction of the surface. The recording/reproduction characteristics of the magnetized perpendicular magnetic recording medium were evaluated by using Read-write analyzer 1632 and Spinstand S1701MP manufactured by GUZIK, U.S.A.

A recoding/reproduction head had a single-pole head as a recording element, and a head using the magnetoresistive effect and having a recording track width of 0.25 μm and a reproduction track width of 0.15 μm as a reproduction element. The measurements were performed at a disk rotational speed of 4,200 rpm in a predetermined radial position 22.2 mm from the center. Consequently, the SNRm (a reproduction signal output S: an output at a linear recording density of 119 kFCI, Nm: the rms value (root mean square) of noise measured when data was recorded at 716 kFCI) of the medium was 27.0 dB, demonstrating that a good medium was obtained.

Comparative Example 1

As a comparative perpendicular magnetic recording medium, a perpendicular magnetic recording medium was obtained following the same procedure as for the perpendicular magnetic recording medium of Example 1 except that no Si seed layer was formed and a Pd first nonmagnetic underlayer was formed at a normal Ar pressure of 0.7 Pa.

The obtained perpendicular magnetic recording medium had the same layer arrangement as that of the perpendicular magnetic recording medium shown in FIG. 2 except that no Si seed layer was formed.

Then, X-ray diffraction measurement was performed on the obtained perpendicular magnetic recording medium. As a consequence, an Ru(00.2) peak, CoCrPt (00.2) peak, and Pd(111) peak were observed.

When rocking curve measurement was performed on the Ru and CoCrPt peaks, the half-widths of the peaks were 4.2° (Ru) and 5.1° (CoCrPt).

The crystal structure of the comparative medium was checked by performing sectional TEM measurement on the obtained perpendicular magnetic recording medium. Consequently, crystal lattice stripes were clearly observed in the Pd first nonmagnetic underlayer, and the directions of the stripes were almost uniform in a direction perpendicular to the film surface.

Also, in the Ru second nonmagnetic underlayer and CoCrPt—SiO$_2$ recording layer, crystal lattice stripes were regularly arranged in the direction perpendicular to the film surface.

These results demonstrate that epitaxial growth occurred from the Pd first nonmagnetic underlayer to the recording layer.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the comparative medium. Consequently, the perpendicular magnetic recording layer was made of crystal grains having an average grain size of about 8 to 14 nm.

The SNRm was 17.5 dB when the recording/reproduction characteristics were evaluated in the same manner as in Example 1.

Accordingly, the medium of the present invention of Example 1 in which the Si seed layer and Pd first nonmagnetic underlayer were formed at a low Ar pressure was superior to the conventional medium of Comparative Example 1 in any of the fineness and crystallinity of the crystal grains in the perpendicular magnetic recording layer and the recording/reproduction characteristics.

Comparative Example 2

As a comparative perpendicular magnetic recording medium, a perpendicular magnetic recording medium was obtained following the same procedure as for the perpendicular magnetic recording medium of Example 1 except that no Si seed layer was formed and Pt was used instead of Pd as a first nonmagnetic underlayer. The obtained perpendicular magnetic recording medium had the same layer arrangement as that of the perpendicular magnetic recording medium shown in FIG. 2 except that no Si seed layer was formed and the Pt first nonmagnetic underlayer was formed instead of the Pd first nonmagnetic underlayer.

Then, X-ray diffraction measurement was performed on the obtained perpendicular magnetic recording medium. As a consequence, an Ru(00.2) peak, CoCrPt (00.2) peak, and Pt (111) peak were observed.

When rocking curve measurement was performed on the Ru and CoCrPt peaks, the half-widths of the peaks were 4.5° (Ru) and 5.5° (CoCrPt).

The crystal structure of the comparative medium was checked by performing sectional TEM measurement on the obtained perpendicular magnetic recording medium. Consequently, crystal lattice stripes were clearly observed in the Pt first nonmagnetic underlayer, and the directions of the stripes were almost uniform in a direction perpendicular to the film surface.

Also, in the Ru second nonmagnetic underlayer and CoCrPt—$SiO_2$ recording layer, crystal lattice stripes were regularly arranged in the direction perpendicular to the film surface. These results demonstrate that epitaxial growth occurred from the Pt first nonmagnetic underlayer to the perpendicular magnetic recording layer.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the comparative medium. Consequently, the perpendicular magnetic recording layer was made of crystal grains having an average grain size of about 9 to 16 nm.

The SNRm was 15.5 dB when the recording/reproduction characteristics were evaluated in the same manner as in Example 1.

Accordingly, the medium of the present invention of Example 1 in which the Si seed layer and Pd first nonmagnetic underlayer were formed at a low Ar pressure was superior to the conventional medium of Comparative Example 2 in any of the fineness and crystallinity of the crystal grains in the perpendicular magnetic recording layer and the recording/reproduction characteristics.

Comparative Example 3

As a comparative perpendicular magnetic recording medium, a perpendicular magnetic recording medium was obtained following the same procedure as for the perpendicular magnetic recording medium of Example 1 except that an Si seed layer and Pd first nonmagnetic underlayer were formed at a normal Ar pressure of 0.7 Pa.

The obtained perpendicular magnetic recording medium had the same layer arrangement as that of the perpendicular magnetic recording medium shown in FIG. 2.

Then, X-ray diffraction measurement was performed on the obtained perpendicular magnetic recording medium. As a consequence, an Ru(00.2) peak, CoCrPt (00.2) peak, and Pd(111) peak were observed.

When rocking curve measurement was performed on the Ru and CoCrPt peaks, the half-widths of the peaks were 4.00 (Ru) and 5.00 (CoCrPt).

The crystal structure of the comparative medium was checked by performing sectional TEM measurement on the obtained perpendicular magnetic recording medium. Consequently, the Si seed layer was amorphous because no crystal lattice stripes were observed.

In the Pd first nonmagnetic underlayer, crystal lattice stripes were clearly observed, and the directions of the stripes were almost uniform in a direction perpendicular to the film surface.

Also, in the Ru second nonmagnetic underlayer and CoCrPt—$SiO_2$ recording layer, crystal lattice stripes were regularly arranged in the direction perpendicular to the film surface.

These results reveal that epitaxial growth occurred from the Pd first nonmagnetic underlayer to the recording layer.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the comparative medium. Consequently, the perpendicular magnetic recording layer was made of crystal grains having an average grain size of about 8 to 14 nm.

The SNRm was 18.3 dB when the recording/reproduction characteristics were evaluated in the same manner as in Example 1.

Accordingly, the medium of the present invention of Example 1 in which the Si seed layer and Pd first nonmagnetic underlayer were formed at a low Ar pressure was superior to the conventional medium of Comparative Example 3 in any of the fineness and crystallinity of the crystal grains in the perpendicular magnetic recording layer and the recording/reproduction characteristics.

Comparative Example 4

As a comparative perpendicular magnetic recording medium, a perpendicular magnetic recording medium was obtained following the same procedure as for the perpendicular magnetic recording medium of Example 1 except that an Si seed layer and a Pt first nonmagnetic underlayer, instead of the Pd first nonmagnetic underlayer, were formed at a normal Ar pressure of 0.7 Pa.

The obtained perpendicular magnetic recording medium had the same layer arrangement as that of the perpendicular magnetic recording medium shown in FIG. 2 except that the Pt first nonmagnetic underlayer was formed instead of the Pd first nonmagnetic underlayer.

Then, X-ray diffraction measurement was performed on the obtained perpendicular magnetic recording medium. As a consequence, an Ru(00.2) peak, CoCrPt (00.2) peak, and Pt (111) peak were observed.

When rocking curve measurement was performed on the Ru and CoCrPt peaks, the half-widths of the peaks were 4.7° (Ru) and 5.9° (CoCrPt).

The crystal structure of the comparative medium was checked by performing sectional TEM measurement on the obtained perpendicular magnetic recording medium. Consequently, the Si seed layer was amorphous because no crystal lattice stripes were observed.

In the Pt first nonmagnetic underlayer, crystal lattice stripes were clearly observed, and the directions of the stripes were almost uniform in a direction perpendicular to the film surface.

Also, in the Ru second nonmagnetic underlayer and CoCrPt—$SiO_2$ recording layer, crystal lattice stripes were regularly arranged in the direction perpendicular to the film surface. These results reveal that epitaxial growth occurred from the Pt first nonmagnetic underlayer to the recording layer.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the comparative medium. Consequently, the perpendicular magnetic recording layer was made of crystal grains having an average grain size of about 10 to 15 nm.

The SNRm was 14.9 dB when the recording/reproduction characteristics were evaluated in the same manner as in Example 1.

Accordingly, the medium of the present invention of Example 1 in which the Si seed layer and Pd first nonmagnetic underlayer were formed at a low Ar pressure was superior to the conventional medium of Comparative Example 4 in any of the fineness and crystallinity of the crystal grains in the perpendicular magnetic recording layer and the recording/reproduction characteristics.

Comparative Example 5

As a comparative perpendicular magnetic recording medium, a perpendicular magnetic recording medium was obtained following the same procedure as for the perpendicular magnetic recording medium of Example 1 except that an Si seed layer and a Pt first nonmagnetic underlayer, instead of a Pd first nonmagnetic underlayer, were formed at an Ar pressure of 0.1 Pa lower than the normal pressure.

The obtained perpendicular magnetic recording medium had the same layer arrangement as that of the perpendicular magnetic recording medium shown in FIG. 2 except that the Pt first nonmagnetic underlayer was formed instead of the Pd first nonmagnetic underlayer.

Then, X-ray diffraction measurement was performed on the obtained perpendicular magnetic recording medium. As a consequence, an Ru(00.2) peak, CoCrPt (00.2) peak, and Pt (111) peak were observed.

When rocking curve measurement was performed on the Ru and CoCrPt peaks, the half-widths of the peaks were 3.7° (Ru) and 3.9° (CoCrPt).

The crystal structure of the comparative medium was checked by performing sectional TEM measurement on the obtained perpendicular magnetic recording medium.

Consequently, the Si seed layer was amorphous because no crystal lattice stripes were observed.

In the Pt first nonmagnetic underlayer, crystal lattice stripes were clearly observed, but the directions of the stripes were not uniform. This indicates that the layer had a fine crystal structure.

Also, in the Ru second nonmagnetic underlayer and CoCrPt—SiO$_2$ recording layer, crystal lattice stripes were regularly arranged in a direction perpendicular to the film surface.

These results reveal that epitaxial growth occurred from the second nonmagnetic underlayer to the recording layer.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the comparative medium.

Consequently, the perpendicular magnetic recording layer was made of crystal grains having an average grain size of about 7 to 11 nm.

The SNRm was 19.1 dB when the recording/reproduction characteristics were evaluated in the same manner as in Example 1.

Although the grain size was smaller than those of the other comparative examples, the improvement of the orientation was still unsatisfactory.

Accordingly, the medium of the present invention of Example 1 in which the Si seed layer and Pd first nonmagnetic underlayer were formed at a low Ar pressure was superior to the conventional medium of Comparative Example 5 in any of the fineness and crystallinity of the crystal grains in the perpendicular magnetic recording layer and the recording/reproduction characteristics.

Example 2

As the first nonmagnetic underlayer of the medium of the present invention, two types of targets having different composition amounts, i.e., a Pd-34 at % Si target (the soft magnetic layer side) and a Pd-5 at % Si target (the perpendicular magnetic recording layer side) were prepared.

A perpendicular magnetic recording medium was manufactured following the same procedure as in Example 1 except that the above-mentioned two types of Pd—Si targets, i.e., the Pd-34 at % Si target and Pd-5 at % Si target were used instead of the Pd target as the first nonmagnetic underlayer and no Si seed layer was formed.

The obtained perpendicular magnetic recording medium had the same layer arrangement as that of the perpendicular magnetic recording medium shown in FIG. 2 except that no Si seed layer was formed and two Pd—Si layers having different compositions were formed as the first nonmagnetic underlayer.

Figure 4:
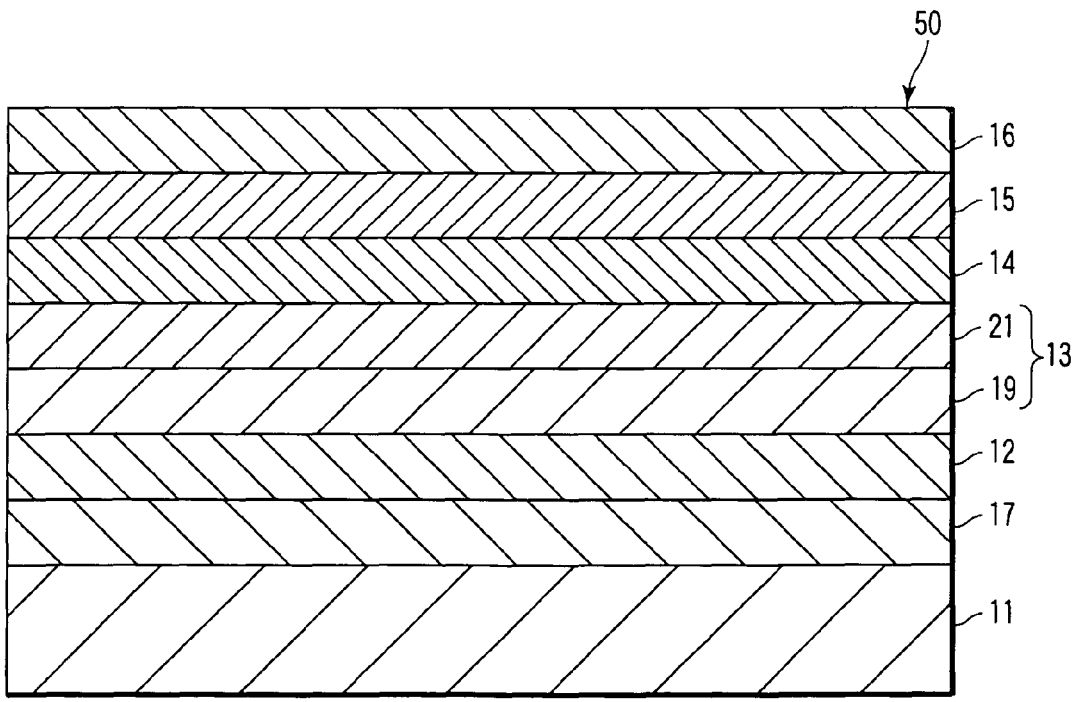
FIG. 4 is a sectional view schematically showing the arrangement of a perpendicular magnetic recording medium according to still another embodiment of the present invention.

FIG. 4 is a schematic sectional view showing the arrangement of the obtained perpendicular magnetic recording medium. As shown in FIG. 4, a perpendicular magnetic recording medium 50 had a structure formed by sequentially stacking a CoCrPt ferromagnetic layer 17, a CoZrNb soft magnetic backing layer 12, a first nonmagnetic underlayer 13 in which a Pd-34 at % Si layer 19 and Pd-5at % Si layer 21 were stacked, an Ru second nonmagnetic underlayer 14, a CoPtCr—SiO$_2$ perpendicular magnetic recording layer 15, a C protective film 16, and a lubricating layer (not shown) on a nonmagnetic substrate 11.

X-ray diffraction measurement was performed on the medium of the present invention. As a consequence, an Ru(00.2) peak and CoCrPt (00.2) peak were observed, but no Pd(111) peak was observed.

When rocking curve measurement was performed on these peaks, the half-widths of the peaks were 2.6° (Ru) and 3.2° (CoCrPt).

This demonstrates that the perpendicular magnetic recording layer had good crystallinity.

The crystal structure of the medium of the present invention was checked by performing transmission analytical electron microscope (TEM) measurement on the obtained perpendicular magnetic recording medium in the direction of the section. Consequently, the Pd—Si first nonmagnetic underlayer on the soft magnetic layer side was amorphous because no clear crystal lattice stripes were observed.

In the Pd—Si first nonmagnetic underlayer on the perpendicular magnetic layer side, crystal lattice strips were clearly observed, but the directions of the stripes were not uniform. This shows that the layer had a fine crystal structure.

In the Ru second nonmagnetic underlayer and CoCrPt—SiO$_2$ recording layer, crystal lattice stripes were regularly arranged in a direction perpendicular to the film surface. This reveals that epitaxial growth occurred from the second nonmagnetic underlayer to the recording layer.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the medium of the present invention.

Consequently, the perpendicular magnetic recording layer was made of crystal grains having an average grain size of about 5 to 7 nm.

Also, the SNRm was 26.0 dB when the recording/reproduction characteristics were evaluated in the same manner as in Example 1, indicating that the medium had favorable characteristics.

Comparative Example 6

As a comparative perpendicular magnetic recording medium, a perpendicular magnetic recording medium was obtained following the same procedure as for the perpendicular magnetic recording medium of Example 1 except that no Si seed layer was formed and Pd-5at % Si was used instead of Pd as a first nonmagnetic underlayer. The obtained perpendicular magnetic recording medium had the same layer arrangement as that of the perpendicular magnetic recording medium shown in FIG. 2 except that the Pd—Si first nonmagnetic underlayer was formed instead of the Pd first nonmagnetic underlayer and no Si seed layer was formed.

Then, X-ray diffraction measurement was performed on the obtained perpendicular magnetic recording medium. As a consequence, an Ru(00.2) peak and CoCrPt (00.2) peak were observed, but no Pd(111) peak was observed. When rocking curve measurement was performed on the Ru and CoCrPt peaks, the half-widths of the peaks were 5.0° (Ru) and 6.2° (CoCrPt).

The crystal structure of the comparative medium was checked by performing sectional TEM measurement on the obtained perpendicular magnetic recording medium. Consequently, the Pd—Si first nonmagnetic underlayer was in a fine crystal state because lattice stripes were observed, but the orientations of the fine crystals were random. In addition, the film had projections and recesses and was not flat. On the other hand, crystal lattice stripes were arranged in a direction perpendicular to the film surface from the Ru second nonmagnetic underlayer to the CoCrPt—$SiO_2$ recording layer, indicating that epitaxial growth occurred. However, no particular epitaxial growth occurred from the Pd—Si first nonmagnetic underlayer to the Ru second nonmagnetic underlayer. Therefore, variations in growth direction and grain size were observed in the initial layer portion of the Ru second nonmagnetic underlayer. As a consequence, large grain size variances were observed in the Ru second nonmagnetic underlayer and CoCrPt—$SiO_2$ recording layer.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the comparative medium. Consequently, the perpendicular magnetic recording layer was made of crystal grains having an average grain size of about 7 to 17 nm.

The SNRm was 17.5 dB when the recording/reproduction characteristics were evaluated in the same manner as in Example 1.

Accordingly, the medium of the present invention of Example 2 was superior to the conventional medium of Comparative Example 6 in any of the fineness and crystallinity of the crystal grains in the perpendicular magnetic recording layer and the recording/reproduction characteristics.

Comparative Example 7

As a comparative perpendicular magnetic recording medium, a perpendicular magnetic recording medium was obtained following the same procedure as for the perpendicular magnetic recording medium of Example 1 except that no Si seed layer was formed and Pd-26 at % Si was used instead of Pd as a first nonmagnetic underlayer. The obtained perpendicular magnetic recording medium had the same layer arrangement as that of the perpendicular magnetic recording medium shown in FIG. 2 except that the Pd—Si first nonmagnetic underlayer was formed instead of the Pd first nonmagnetic underlayer and no Si seed layer was formed.

Then, X-ray diffraction measurement was performed on the obtained perpendicular magnetic recording medium. As a consequence, an Ru(00.2) peak and CoCrPt (00.2) peak were observed, but no Pd(111) peak was observed. When rocking curve measurement was performed on the Ru and CoCrPt peaks, the half-widths of the peaks were 4.1° (Ru) and 5.1° (CoCrPt).

The crystal structure of the comparative medium was checked by performing sectional TEM measurement on the obtained perpendicular magnetic recording medium. Consequently, the Pd—Si first nonmagnetic underlayer had a segregated granular structure that segregated into Pd grains and an Si grain boundary.

Lattice stripes were regularly arranged from the Pd—Si first nonmagnetic underlayer to the CoCrPt—$SiO_2$ recording layer, indicating that epitaxial growth occurred. However, the film interface had projections and recesses and was not flat.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the comparative medium. Consequently, the perpendicular magnetic recording layer was made of crystal grains having an average grain size of about 7 to 10 nm.

The SNRm was 19.5 dB when the recording/reproduction characteristics were evaluated in the same manner as in Example 1.

Accordingly, the medium of the present invention of Example 2 was superior to the conventional medium of Comparative Example 7 in any of the fineness and crystallinity of the crystal grains in the perpendicular magnetic recording layer and the recording/reproduction characteristics.

Comparative Example 8

As a comparative perpendicular magnetic recording medium, a perpendicular magnetic recording medium was obtained following the same procedure as for the perpendicular magnetic recording medium of Example 1 except that neither an Si seed layer nor an Ru second nonmagnetic underlayer was formed and Pd-26 at % Si was used instead of Pd as a first nonmagnetic underlayer.

The obtained perpendicular magnetic recording medium had the same layer arrangement as that of the perpendicular magnetic recording medium shown in FIG. 2 except that the Pd—Si first nonmagnetic underlayer was formed instead of the Pd first nonmagnetic underlayer and neither an Si seed layer nor an Ru second nonmagnetic underlayer was formed. Then, X-ray diffraction measurement was performed on the obtained perpendicular magnetic recording medium. As a consequence, a weak CoCrPt (00.2) peak was observed.

When rocking curve measurement was performed on the CoCrPt peak, the half-width of the peak was 10.1° (CoCrPt).

The crystal structure of the comparative medium was checked by performing sectional TEM measurement on the obtained perpendicular magnetic recording medium. Consequently, the Pd—Si first nonmagnetic underlayer had a segregated granular structure that segregated into Pd grains and an Si grain boundary.

Lattice stripes were regularly arranged from the Pd—Si first nonmagnetic underlayer to the CoCrPt—SiO$_2$ recording layer, indicating that epitaxial growth occurred. However, the film interface had projections and recesses and was not flat.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the comparative medium. Consequently, the perpendicular magnetic recording layer was made of crystal grains having an average grain size of about 14 to 20 nm.

In addition, the SNRm was 3.8 dB when the recording/reproduction characteristics were evaluated in the same manner as in Example 1.

Accordingly, the medium of the present invention of Example 2 was superior to the conventional medium of Comparative Example 8 in any of the fineness and crystallinity of the crystal grains in the perpendicular magnetic recording layer and the recording/reproduction characteristics.

Comparative Example 9

As a comparative perpendicular magnetic recording medium, a perpendicular magnetic recording medium was obtained following the same procedure as for the perpendicular magnetic recording medium of Example 1 except that Pd-26 at % Si was used instead of Pd as a first nonmagnetic underlayer.

The obtained perpendicular magnetic recording medium had the same layer arrangement as that of the perpendicular magnetic recording medium shown in FIG. 2 except that the Pd—Si first nonmagnetic underlayer was formed instead of the Pd first nonmagnetic underlayer. Then, X-ray diffraction measurement was performed on the obtained perpendicular magnetic recording medium. As a consequence, an Ru(00.2) peak and CoCrPt (00.2) peak were observed, but no Pd(111) peak was observed.

When rocking curve measurement was performed on the Ru and CoCrPt peaks, the half-widths of the peaks were 4.2° (Ru) and 5.7° (CoCrPt).

The crystal structure of the comparative medium was checked by performing sectional TEM measurement on the obtained perpendicular magnetic recording medium. Consequently, the Pd—Si first nonmagnetic underlayer was almost amorphous because no lattice stripes were observed.

On the other hand, lattice stripes were regularly arranged from the Ru second nonmagnetic underlayer to the CoCrPt—SiO$_2$ recording layer, indicating that epitaxial growth occurred.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the comparative medium. Consequently, the perpendicular magnetic recording layer was made of crystal grains having an average grain size of about 8 to 13 nm.

The SNRm was 18.1 dB when the recording/reproduction characteristics were evaluated in the same manner as in Example 1.

Accordingly, the medium of the present invention of Example 2 was superior to the conventional medium of Comparative Example 9 in any of the fineness and crystallinity of the crystal grains in the perpendicular magnetic recording layer and the recording/reproduction characteristics.

Example 3

A perpendicular magnetic recording medium was manufactured following the same procedure as in Example 1 except that a nonmagnetic seed layer was formed using an Al-45 at % Si target instead of the Si target.

The obtained perpendicular magnetic recording medium had the same layer arrangement as that of the perpendicular magnetic recording medium shown in FIG. 2 except that the AlSi seed layer was formed instead of the Si seed layer.

X-ray diffraction measurement was performed on the medium of the present invention.

As a consequence, an Ru(00.2) peak and CoCrPt (00.2) peak were observed, but no Pd(111) peak was observed. When rocking curve measurement was performed on these peaks, the half-widths of the peaks were 2.70 (Ru) and 3.4° (CoCrPt). This shows that the perpendicular magnetic recording layer had good crystallinity.

The crystal structure of the medium of the present invention was checked by performing transmission analytical electron microscope (TEM) measurement on the obtained perpendicular magnetic recording medium in the direction of the section. Consequently, crystal lattice stripes were clearly observed in the Pd first nonmagnetic underlayer, but the directions of the stripes were not uniform. This demonstrates that the layer had a fine crystal structure.

In the Ru second nonmagnetic underlayer and CoCrPt—SiO$_2$ recording layer, crystal lattice stripes were regularly arranged in a direction perpendicular to the film surface. This reveals that epitaxial growth occurred from the second nonmagnetic underlayer to the recording layer.

Subsequently, transmission analytical electron microscope (TEM) measurement was performed on the perpendicular magnetic recording layer of the obtained perpendicular magnetic recording medium, thereby checking the grain size distribution of the crystal grains in the perpendicular magnetic recording layer of the medium of the present invention.

Consequently, the perpendicular magnetic recording layer was made of crystal grains having an average grain size of about 4 to 7 nm.

Also, the SNRm was 27.3 dB when the recording/reproduction characteristics were evaluated in the same manner as in Example 1, indicating that the medium had favorable characteristics.

Example 4

Perpendicular magnetic recording media were manufactured following the same procedure as in Example 1 except that the gas pressure in the Ar ambient was changed between 0.05 to 1.0 Pa during DC magnetron sputtering when forming the Si seed layer and Pd first nonmagnetic underlayer of the medium of the present invention.

The obtained perpendicular magnetic recording media had the same arrangement as that of the perpendicular magnetic recording medium shown in FIG. 2. X-ray diffraction measurement and the same recording/reproduction characteristic evaluation as in Example 1 were performed on the media of the present invention. Table 1 below shows the results of the half-widths of the peaks of the recording layers and the SNRm.

TABLE 1

| Pressure (Pa) | Half-width (CoCrPt) | SNRm |
|---|---|---|
| 0.05 | 3.1 | 26.5 |
| 0.1 | 3.0 | 27.0 |
| 0.2 | 3.7 | 26.8 |
| 0.3 | 3.9 | 26.1 |
| 0.4 | 3.9 | 25.8 |
| 0.5 | 4.1 | 25.3 |
| 0.6 | 4.9 | 21.1 |
| 0.7 | 5.1 | 20.4 |
| 0.8 | 5.5 | 20.3 |
| 0.9 | 5.7 | 20.1 |
| 1.0 | 5.8 | 19.9 |

The results shown in Table 1 indicate that favorable characteristics were obtained when the seed layer and first nonmagnetic underlayer were formed at a pressure of 0.5 Pa or less. Note that this pressure can be set at 0.05 Pa or more in practice. A pressure lower than 0.05 Pa is inappropriate because no stable DC sputtering can be performed any longer.

Example 5

Perpendicular magnetic recording media were manufactured following the same procedure as in Example 1 except that a first nonmagnetic underlayers was formed using targets for stacking two Pd—Si layers having different compositions, instead of the Pd target, and no Si seed layer was formed.

As the targets for stacking two Pd—Si layers, a Pd-34 at % Si target was used on the soft magnetic layer side, and a Pd-xat % Si (wherein x was 3, 5, 7, 10, 13, 17, 20, 26, and 34) target was used on the perpendicular magnetic recording layer side.

The obtained perpendicular magnetic recording media had the same arrangement as that of the perpendicular magnetic recording medium shown in FIG. 4.

X-ray diffraction measurement was performed on the obtained media.

Also, the recording/reproduction characteristics were evaluated in the same manner as in Example 1.

Table 2 below shows the results of the half-widths of the peaks of the perpendicular magnetic recording layers and the SNRm.

TABLE 2

| Si (at %) | Half-width (CoCrPt) | SNRm |
|---|---|---|
| 3 | 3.2 | 26.3 |
| 5 | 3.2 | 26.0 |
| 7 | 3.7 | 23.8 |
| 10 | 4.5 | 21.2 |
| 13 | 4.7 | 20.4 |
| 17 | 5.5 | 19.5 |
| 20 | 5.2 | 19.0 |
| 26 | 5.8 | 18.3 |
| 34 | 9.9 | 12.1 |

The results shown in Table 2 demonstrate that the medium of this application had favorable characteristics when the Si content in the Pd—Si film was 3 to 10 at %.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A perpendicular magnetic recording medium comprising:
   a nonmagnetic substrate;
   at least one soft magnetic layer formed on the nonmagnetic substrate;
   a first nonmagnetic underlayer formed on the soft magnetic layer, consisting of a fine crystal structure which is an aggregation of fine crystal grains of 1 to 3nm in diameter, and comprises a first Pd-Si layer formed on a side of the soft magnetic layer, and a second Pd-Si layer formed on the first Pd-Si layer and different in composition ratio from the first Pd-Si layer, and the Si content in the first Pd-Si layer is not less than 10 at%, and the Si content in the second Pd-Si layer is less than 10 at%;
   a second nonmagnetic underlayer formed on the first nonmagnetic underlayer, and made of one of ruthenium and a ruthenium alloy; and
   a perpendicular magnetic recording layer formed on the second nonmagnetic underlayer.

2. The magnetic recording medium according to claim 1, wherein the first nonmagnetic underlayer is deposited by evaporation in an ambient at a gas pressure of not more than 0.5 Pa.

3. A magnetic recording/reproduction apparatus comprising:
   a perpendicular magnetic recording medium including
   a nonmagnetic substrate,
   at least one soft magnetic layer formed on the nonmagnetic substrate,
   a first nonmagnetic underlayer formed on the soft magnetic layer, consisting of a fine crystal structure which is an aggregation of fine crystal grains of 1 to 3nm in diameter, and comprises a first Pd-Si layer formed on a side of the soft magnetic layer, and a second Pd-Si layer formed on the first Pd-Si layer and different in composition ratio from the first Pd-Si layer, and the Si content in the first Pd-Si layer is not less than 10 at%, and the Si content in the second Pd-Si layer is less than 10 at%;
   a second nonmagnetic underlayer formed on the first nonmagnetic underlayer, and made of one of ruthenium and a ruthenium alloy, and
   a perpendicular magnetic recording layer formed on the second nonmagnetic underlayer;
   a mechanism which supports and rotates the perpendicular magnetic recording medium;
   a magnetic head having an element for recording information on the perpendicular magnetic recording medium, and an element for reproducing information recorded on the perpendicular magnetic recording medium; and
   a carriage assembly which movably supports the magnetic head with respect to the perpendicular magnetic recording medium.

4. An apparatus according to claim 3, wherein the recording/reproduction head comprises a single-pole recording head.

5. An apparatus according to claim 3, wherein the first nonmagnetic underlayer is deposited by evaporation in an ambient at a gas pressure of not more than 0.5 Pa.

* * * * *